(12) United States Patent
Luo et al.

(10) Patent No.: US 10,332,298 B2
(45) Date of Patent: Jun. 25, 2019

(54) ANIMATION GENERATION METHOD, TERMINAL AND STORAGE MEDIUM USING ACTION DATA, RIGS, AND FUSED BONE DATA

(71) Applicant: TENCENT TECHNOLOGY (SHENZHEN) COMPANY LIMITED, Shenzhen, Guangdong (CN)

(72) Inventors: Jun Luo, Shenzhen (CN); Kaiyu Mao, Shenzhen (CN); Meiyun Han, Shenzhen (CN); Qilin Chen, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 15/780,309

(22) PCT Filed: May 27, 2017

(86) PCT No.: PCT/CN2017/086235
§ 371 (c)(1),
(2) Date: May 31, 2018

(87) PCT Pub. No.: WO2017/202383
PCT Pub. Date: Nov. 30, 2017

(65) Prior Publication Data
US 2018/0357808 A1 Dec. 13, 2018

(30) Foreign Application Priority Data
May 27, 2016 (CN) .......................... 2016 1 0369510

(51) Int. Cl.
*G06T 13/00* (2011.01)
*G06T 13/40* (2011.01)

(52) U.S. Cl.
CPC .............. *G06T 13/40* (2013.01); *G06T 13/00* (2013.01)

(58) Field of Classification Search
CPC ....... G06T 13/00–80; A63F 2300/6607; A63F 2300/6623; H04M 1/72544
See application file for complete search history.

(56) References Cited

U.S. PATENT DOCUMENTS

| 6,310,627 B1 * | 10/2001 | Sakaguchi | A41H 3/007 345/630 |
| 2008/0052242 A1 * | 2/2008 | Merritt | G06F 21/10 705/59 |

(Continued)

FOREIGN PATENT DOCUMENTS

CN 103426192 A 12/2013

OTHER PUBLICATIONS

Cordier, Frédéric, et al. "Virtual-try-on on the web." Laval Virtual (2001). (Year: 2001).*

(Continued)

*Primary Examiner* — Daniel F Hajnik
(74) *Attorney, Agent, or Firm* — Sughrue Mion, PLLC

(57) ABSTRACT

An animation generation method is performed by at least one processor, and includes obtaining an animation generation instruction, obtaining first bone data for a virtual target and first rig data for the virtual target, based on the animation generation instruction, obtaining an action identifier, and obtaining action data, second bone data for an additional element, and second rig data for the additional element, based on the action identifier. The method further includes fusing the first bone data and the second bone data to obtain fused bone data, controlling the fused bone data to change with time, based on the action data, and rendering an (Continued)

animation, based on the fused bone data controlled to change with time, the first rig data, and the second rig data.

15 Claims, 10 Drawing Sheets

(56) References Cited

U.S. PATENT DOCUMENTS

| | | | | |
|---|---|---|---|---|
| 2010/0134490 A1* | 6/2010 | Corazza | ................. | G06T 13/40 345/420 |
| 2012/0218262 A1* | 8/2012 | Yomdin | ................. | G06T 13/40 345/419 |
| 2013/0198210 A1* | 8/2013 | Lee | ................. | G06F 17/30861 707/755 |
| 2014/0208239 A1* | 7/2014 | Barker | .............. | G06F 15/17306 715/757 |
| 2015/0022517 A1* | 1/2015 | Jutan | ....................... | G06T 13/40 345/419 |

OTHER PUBLICATIONS

Lander, "Skin Them Bones: Game Programming for the Web Generation", Graphic Content, Game Developer, May 1998, pg. 11-16 (total 4 pages).

Communication dated Apr. 8, 2019 from the State Intellectual Property Office of the P.R.C. in counterpart Application No. 201610369510.5.

* cited by examiner

ANIMATION GENERATION METHOD, TERMINAL AND STORAGE MEDIUM USING ACTION DATA, RIGS, AND FUSED BONE DATA

CROSS-REFERENCE TO RELATED APPLICATION

This application claims is a U.S. national stage application under 35 U.S.C. § 371 of International Patent Application No. PCT/CN2017/086235, filed on May 27, 2017, which claims priority from Chinese Patent Application No. 201610369510.5, entitled "ANIMATION GENERATION METHOD AND APPARATUS" filed with the Patent Office of China on May 27, 2016, which are incorporated herein by reference in their entireties.

BACKGROUND

1. Field

Methods and apparatuses consistent with embodiments relate to the field of animation technologies, and in particular, to an animation generation method, a animation generation terminal, and a storage medium.

2. Description of Related Art

An animation is visual data that can dynamically display a visual element. A traditional animation generation method can store each frame of an animation image including a virtual target. A state of a virtual target between animation images with different frames is different. An animation can be generated by rendering each frame of the animation image in a time order. However, this animation generation method uses large storage resources.

Traditionally, only a key frame of an animation is stored. A transition frame between key frames is calculated by using an interpolation manner when the animation is generated, to render and form the animation according to the frames, thereby reducing consumption of the storage resources. However, storing the animation image according to the frames consumes large storage resources, even if only the key frame is stored. Therefore, the traditional animation generation method may be improved.

SUMMARY

According to embodiments, there is provided an animation generation method being performed by at least one processor, the method including obtaining an animation generation instruction, obtaining first bone data for a virtual target and first rig data for the virtual target, based on the animation generation instruction, obtaining an action identifier, and obtaining action data, second bone data for an additional element, and second rig data for the additional element, based on the action identifier. The method further includes fusing the first bone data and the second bone data to obtain fused bone data, controlling the fused bone data to change with time, based on the action data, and rendering an animation, based on the fused bone data controlled to change with time, the first rig data, and the second rig data.

According to embodiments, there is provided a terminal including at least one memory configured to store computer program code, and at least one processor configured to access the at least one memory and operate according to the computer program code, the computer program code including data obtaining code configured to cause the at least one processor to obtain an animation generation instruction, obtain first bone data for a virtual target and first rig data for the virtual target, based on the animation generation instruction, obtain an action identifier, and obtain action data, second bone data for an additional element, and second rig data for the additional element, based on the action identifier. The computer program code further includes bone fusion code configured to cause the at least one processor to fuse the first bone data and the second bone data to obtain fused bone data, and animation generation code configured to cause the at least one processor to control the fused bone data change with time, based on the action data, and render an animation, based on the fused bone data controlled to change with time, the first rig data, and the second rig data.

According to embodiments, there is provided a non-transitory computer-readable storage medium storing instructions that cause at least one processor of a terminal to obtain an animation generation instruction, obtain first bone data for a virtual target and first rig data for the virtual target, based on the animation generation instruction, obtain an action identifier, and obtain action data, second bone data for an additional element, and second rig data for the additional element, based on the action identifier. The instructions further cause the at least one processor to fuse the first bone data and the second bone data to obtain fused bone data, control the fused bone data to change with time, based on the action data, and render an animation, based on the fused bone data controlled to change with time, the first rig data, and the second rig data.

BRIEF DESCRIPTION OF THE DRAWINGS

To describe the technical solutions of the embodiments of this application or the existing technology more clearly, the following briefly introduces the accompanying drawings for describing the embodiments or the existing technology. Apparently, the accompanying drawings in the following description show only some embodiments of this application, and persons of ordinary skill in the art may still derive other drawings from these accompanying drawings without creative efforts.

DETAILED DESCRIPTION OF EMBODIMENTS

To make the objectives, technical solutions, and advantages of this application clearer and more comprehensible, the following further describes this application in detail with reference to the accompanying drawings and embodiments. The embodiments described herein are used to explain this application but are not intended to limit this application.

Figure 1:
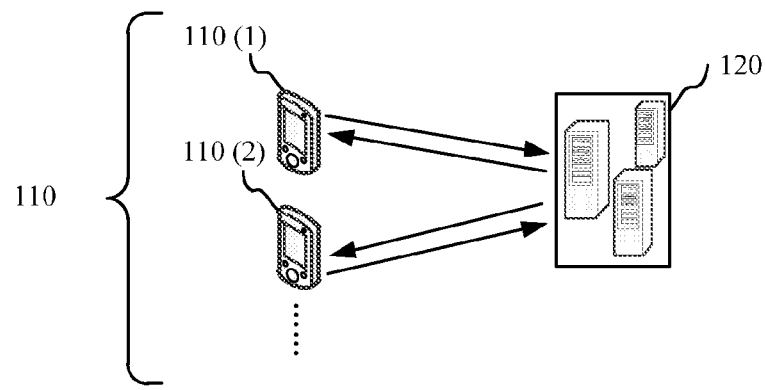
FIG. 1 is a diagram of an application environment of a social message system according to an embodiment.

FIG. 1 is a diagram of an application environment of a social message system according to an embodiment. As shown in FIG. 1, the system includes a terminal 110 and a server 120. The terminal 110 includes a terminal 110(1) and a terminal 110 (2). An instant messaging application is executed on the terminal 110. The terminal 110 (1) and the terminal 110 (2) can exchange messages by using the instant messaging application and the server 120. The terminal 110 (1) and the terminal 110 (2) can transmit an animation message by using the server 120 and display corresponding animation according to the animation message. The server 120 may be an independent physical server, or may be a server cluster.

Figure 2:
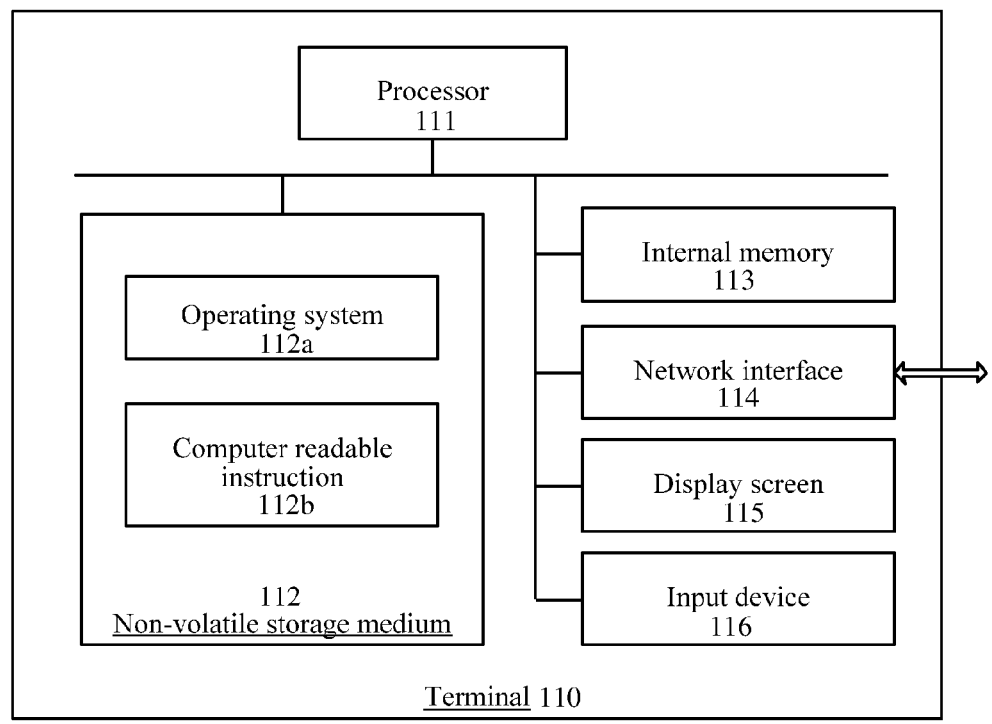
FIG. 2 is a schematic diagram of an internal structure of a terminal according to an embodiment.

FIG. 2 is a schematic diagram of an internal structure of a terminal according an embodiment. As shown in FIG. 2, a terminal 110 includes a processor 111, a non-volatile storage medium 112, an internal memory 113, a network interface 114, a display screen 116, and an input device 116 that are connected by using a system bus. The non-volatile storage medium 112 of the terminal stores an operating system 112a and a computer readable instruction 112b. When the computer readable instruction 112b is executed by the processor 111, an animation generation method is implemented by the processor 111. The processor is used to provide a calculating and control capability, and supports running of the entire terminal 110. The internal memory 113 of the terminal 110 can store a computer readable instruction. When the computer readable instruction is executed by the processor 111, an animation generation method is executed by the processor 111. The network interface 114 is used to access into Internet to communication with an application server. The display screen 115 of the terminal 110 may be a liquid crystal display screen or an e-ink display screen or like. The input device 116 may be a touch layer covering the display screen, or may be a a trackball, or a touchpad disposed on a terminal housing, or may be an external keyboard, touchpad, or mouse or the like. The terminal 110 may be a mobile phone, a tablet computer, a wearable device, or the like. A person of ordinary skill in the art may understand that a shown in FIG. 2 is a block diagram of part structure related to the solution of this application, and is not limited to the foregoing terminal 110 applied in the solution of this application. terminal 110 may include more or less parts, combination of some parts, or different part layouts than what is shown in the figure.

Figure 3:
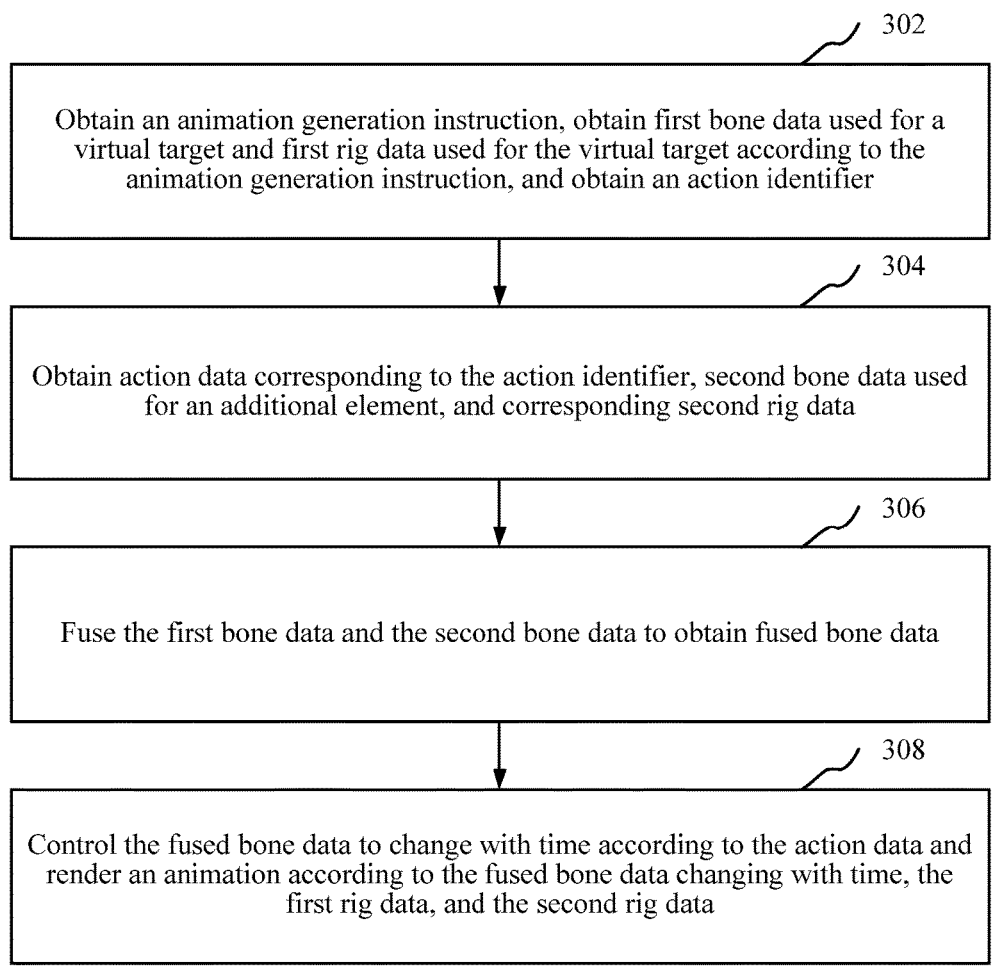
FIG. 3 is a schematic flowchart of an animation generation method according to an embodiment.

FIG. 3 is a schematic flowchart of an animation generation method according to an embodiment. This embodiment is described by using an example in which the method is applied to the terminal 110 (1) shown in FIG. 1 and FIG. 2. The method includes the following steps:

Step 302: Obtain an animation generation instruction, obtain first bone data used for a virtual target and first rig data used for the virtual target according to the animation generation instruction, and obtain an action identifier.

The animation generation instruction is an instruction that a series of processing triggers animation generation to render animation, which may be an instruction or a combination of several instructions. The animation generation instruction can be triggered when a triggering operation of a user is detected, or may be automatically triggered when a terminal detects that a preset condition is satisfied. The triggering operation may be a clicking operation of a button, a pressing operation of a physical case, a sliding and touching operation, or a multi-point touch operation. The preset condition may be, for example, reaching a preset time point or entering a specified interface.

A bone of the bone data refers to a bone in bone animation. A model in the bone animation has a bone structure composed of bones that are connected to each other. A direction and position of the bone can be changed to generate an animation for the model. The model is the virtual target in this embodiment. The virtual target refers to an object that can perform various actions in animation, for example, a virtual character, a virtual animal, virtual vegetation, or virtual transportation. The virtual target may be a two-dimensional or three-dimensional virtual target. The first bone data used for the virtual target may be bone data publicly used by each virtual target, for example, all virtual characters in an animation use the same first bone data. The first bone data can further be specified by the animation generation instruction.

The bone data is data that describes a relationship between bones. The bone data may include a bone state and a layer relationship between bones. The bone state includes, for example, a bone position, a bone direction, and a bone length. The layer relationship between bones may indicate whether bones affect each other and a degree of impact, including a parent and child node relationship between bones. A bone in the bone data can be represented by a coordinate.

Figure 4:
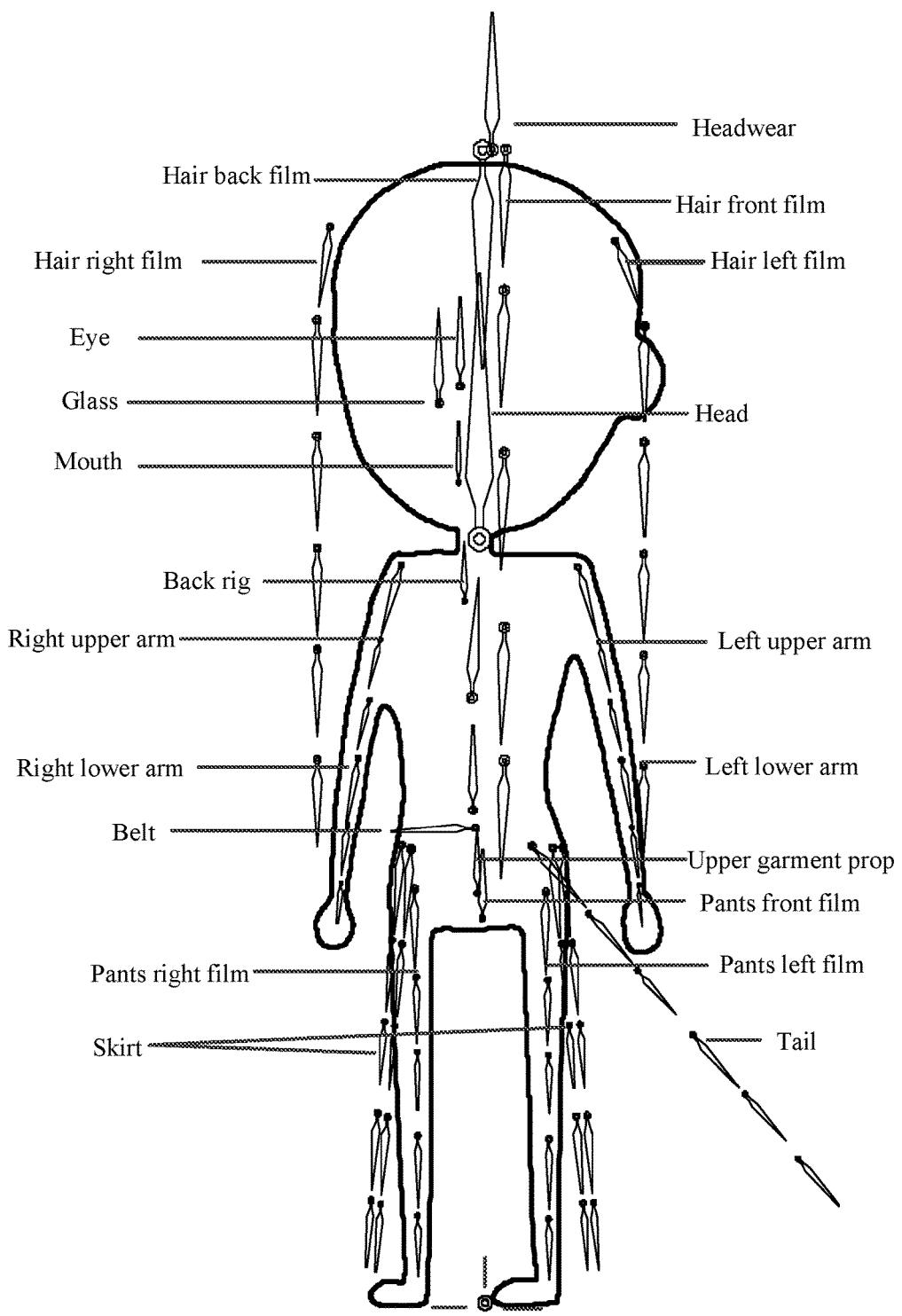
FIG. 4 is a schematic diagram of a bone structure of a virtual character according to an embodiment.

FIG. 4 is a schematic diagram of a bone structure of a virtual character according to an embodiment. Referring to FIG. 4, use a virtual character as an example. A bone in first bone data used for the virtual character may include a head, headwear, a hair front film, a hair back film, a hair left film, a hair right film, eyes, a mouth, back rig, a left upper arm, a left lower arm, a right upper arm, a right lower arm, a belt, an upper garment prop, a pants left film, a pants right film, a skirt, a tail, and the like. The headwear, the hair front film, the hair back film, the hair left film, the hair right film, the eyes, and the mouth are a child node of a parent node.

Rig data is data used to render a visual element according to bone data. In an embodiment, the rig data includes a rig image, a vertex grid, and first mapping data. The mapping data is used to map the rig image into the vertex grid and map a vertex in the vertex grid into a corresponding bone in the bone data. The rig image may be embedded in a slot included in the rig data. The rig image is a texture image, which can be saved in a portable network graphic (PNG) format. The vertex grid is an area including a series of vertexes. The mapping data maps the rig image into the vertex grid and the vertex in the vertex grid is bound with a bone and is endowed with weight. A bone movement may drive a corresponding vertex to move and a vertex movement may change the rig image.

An action identifier is used to only identify a corresponding action. The action refers to an action performed by a virtual target and an additional element. An animation generation instruction can specify the action identifier and a terminal can determine the action identifier according to the animation generation instruction.

Referring back to FIG. 3, the method continues:

Step 304: Obtain action data corresponding to the action identifier, second bone data used for an additional element, and corresponding second rig data.

The additional element is an additional element opposite to the virtual target in an animation, such as an additional character prop, an additional virtual character, an additional animal, additional virtual vegetation, or additional virtual transportation. The additional character prop may be, for example, a weapon used by the character, an armor held, or other objects that are held. The action data is a basis of controlling the virtual target and the additional element to move, including information such as a position of a bone in each animation dram recorded according to a time sequence, a direction, the length, and the like.

The terminal can obtain the action data corresponding to the action identifier, the second bone data corresponding to the action identifier, and the second rig data corresponding to the action identifier. The second bone data corresponds to the second rig data. The second bone data and the second rig data are correspondingly used to the additional element. The terminal can instantly perform step 304 by using a network.

Step 306: Fuse the first bone data and the second bone data to obtain fused bone data.

The terminal can fuse a bone of the additional element to a bone system of the virtual target to obtain the fused bone data according to the bone data such as the position and direction of each bone of the virtual target with reference to the bone data such as the position and direction of each bone of the additional element and impact on a bone of the virtual target. The terminal can use a bone dynamic synthesis technology of a Sava engine to fuse the first bone data and the second bone data to obtain the fused bone data. To ensure the virtual target to move fluently, the vertex in the vertex grid of the additional element does not need to be allocated with much weight. The second bone data, the action data, and the second rig data can generate an independent animation including the additional element.

In an embodiment, the first bone data includes a bone state and a layer relationship between bones. The step 306 includes: adding a bone in the second bone data to a bone in the first bone data according to the second bone data; and adjusting the layer relationship between the additional bone and the corresponding bone in the first bone data to obtain the fused bone data.

The second bone data can specify the bone in the second bone data to be added to a position of a bone system of the first bone data and specify the layer relationship opposite to related bones in the first bone data, to add the bone in the second bone data to the bone in the first bone data according to the second bone data and adjust the layer relationship of the related bones to obtain the fused bone data. In other embodiments, the terminal can further add the bone in the first bone data to the bone in the second bone data and adjust a layer relationship between the additional bone and related bones in the second bone data to obtain the fused bone data.

Figure 5:
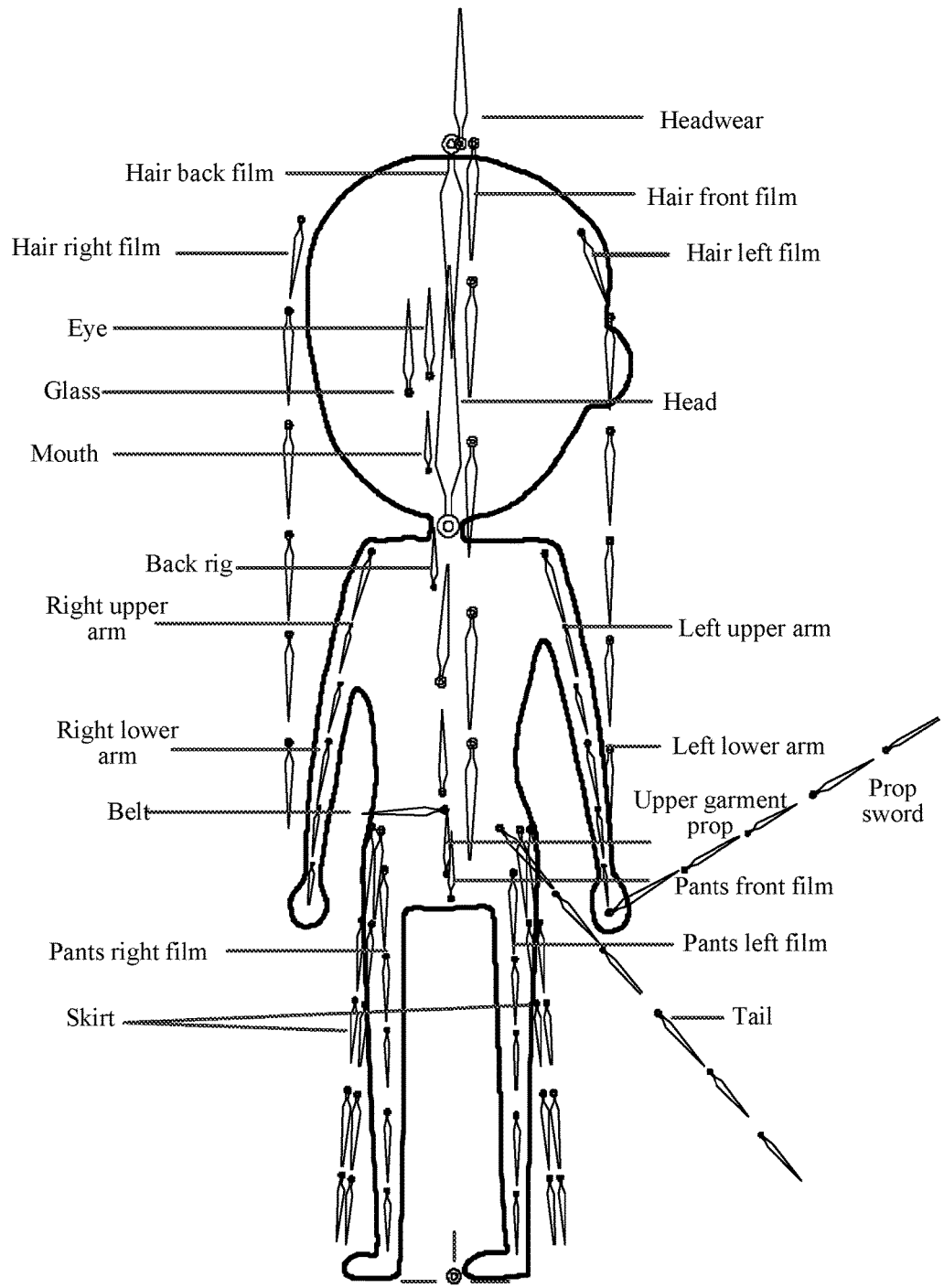
FIG. 5 is a schematic diagram of melting a bone of a prop sword into a bone structure of a virtual character according to an embodiment.

FIG. 5 is a schematic diagram of melting a bone of a prop sword into a bone structure of a virtual character according to an embodiment. For example, referring to FIG. 5, if an additional element is a prop sword, a bone of the prop sword is fused to an end of a left lower arm of a virtual character as shown in FIG. 4 according to second bone data used for the prop sword, and a layer relationship is adjusted to use the bone of the prop sword as a child node of the left lower arm.

Referring back to FIG. 3, the method continues:

Step 308: Control the fused bone data to change with time according to the action data and render an animation according to the fused bone data changing with time, the first rig data, and the second rig data.

The action data records data of how to control a bone of a virtual target and a bone of the additional element to change. Changing information of the bone of the virtual target and the bone of the additional element in each animation frame can be recorded according to a time sequence. The terminal controls the fused bone data to change with time according to the recorded changing information in the action data. The terminal performs a corresponding change to the first rig data and the second rig data according to the fused bone data changing with time and uses the changed first rig data and the changed second rig data to render the animation.

The foregoing animation generation method separates data corresponding to the virtual target in animation from data corresponding to an additional element, obtains the first bone data, the first rig data, the action data, the second bone data, and the corresponding second rig data that are used in generating animation when the animation generation instruction is obtained to generate an animation, fuses the first bone data used for the virtual target and the second bone data used for the additional element to obtain the fused bone data, and controls the fused bone data to change according to the action data, to render animation. Different actions in different animation can be distinguished according to different action identifiers. The virtual target, the action data of various actions, and the additional element are combined to implement colorful animation without separately storing complete data of each animation, thus reducing consumption of storage resources.

Figure 6:
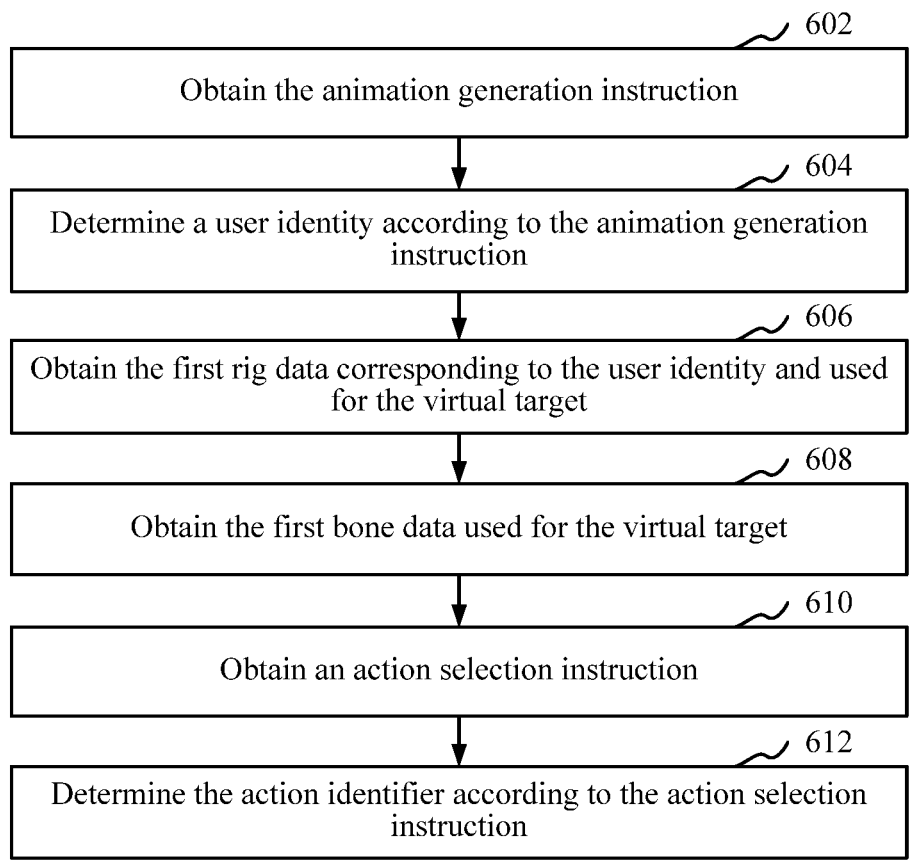
FIG. 6 is a schematic flowchart of a step of obtaining an animation generation instruction, obtaining first bone data used for a virtual target and first rig data used for the virtual target according to the animation generation instruction, and obtaining an action identifier according to an embodiment.

FIG. 6 is a schematic flowchart of a step of obtaining an animation generation instruction, obtaining first bone data used for a virtual target and first rig data used for the virtual target according to the animation generation instruction, and obtaining an action identifier according to an embodiment. As shown in FIG. 6, in an embodiment, the step 302 of FIG. 3 includes the following steps:

Step 602: Obtain the animation generation instruction.

A terminal can trigger the animation generation instruction when a triggering operation of a user is detected, or may automatically trigger the animation generation instruction when the terminal detects that a preset condition is satisfied. The triggering operation may be a clicking operation of a button, a pressing operation of a physical case, a sliding and touching operation, or a multi-point touch operation. The preset condition may be, for example, reaching a preset time point or entering a specified interface.

Step 604: Determine a user identity according to the animation generation instruction.

The user identity refers to a character or a string that can only identify a corresponding user. The user can be a user logged in the terminal or a contact that can communicate with the terminal. The terminal can detect whether a number of a current session participant is less than or equal to 2. If yes, a user identity of a current session object can be determined as the user identity according to the animation generation instruction. If no, a list of the user identity is displayed according to the animation generation instruction, to detect a selection instruction of the list of the user identity and determine the user identity according to the selection instruction.

Step 606: Obtain the first rig data corresponding to the user identity and used for the virtual target.

The terminal can send the determined user identity to a server and receive the first rig data fed back by the server. The first rig data corresponds to the user identity and is used for the virtual target. In an embodiment, the terminal can determine whether the first rig data corresponding to the user identity and used for the virtual target is buffered at local. If yes, the buffered first rig data is directly read. If no, the determined user identity is sent to the server and the first rig data that is fed back by the server corresponding to the user identity and used for the virtual target is received.

Step 608: Obtain the first bone data used for the virtual target.

In an embodiment, the step 608 includes obtaining the first bone data publicly used by the virtual target according to the animation generation instruction. The first bone data can be publicly used by the virtual target in different animations, for example, an animation including a virtual character can use a bone structure shown in FIG. 4. The first bone data can further be publicly used by the virtual target of different types, for example, the virtual character, a virtual animal, virtual vegetation, virtual transportation, and the like can publicly use the bone structure shown in FIG. 4. The first bone data that is publicly used can regulate a design and is easy to assemble, thus further reducing consumption of storage resources.

In an embodiment, the step 608 includes obtaining the first bone data corresponding to the user identity and used for the virtual target. After the terminal obtains the user identity, the first bone data corresponding to the user identity is obtained. The first bone data is used for the virtual target. In this embodiment, different users can be configured with different first bone data, so that the user can self-define the virtual target.

Step 610: Obtain an action selection instruction.

The terminal can display an optional action option and obtain the action selection instruction corresponding to the optional action option. An action option is an action option of an animation used to trigger a corresponding action. The action option can be represented by using a text that describes an action and/or a schematic action diagram. The optional action option is an action option that a currently logged-in user has a right of use. The right of use of the action option can be opened to all users. In this case, the action option is the optional action option for all users.

In an embodiment, the terminal can obtain a currently logged-in user identity, search the optional action option corresponding to the user identity in the local or from the server, and display the searched optional action option. The optional action option can be displayed in a list form, an array form, or a form of multi-page switching display.

In an embodiment, the terminal can display the optional action option in a current session window of an instant messaging application, which can be triggered by an exclusive triggering entrance in a toolbar in the current session window.

Figure 7:
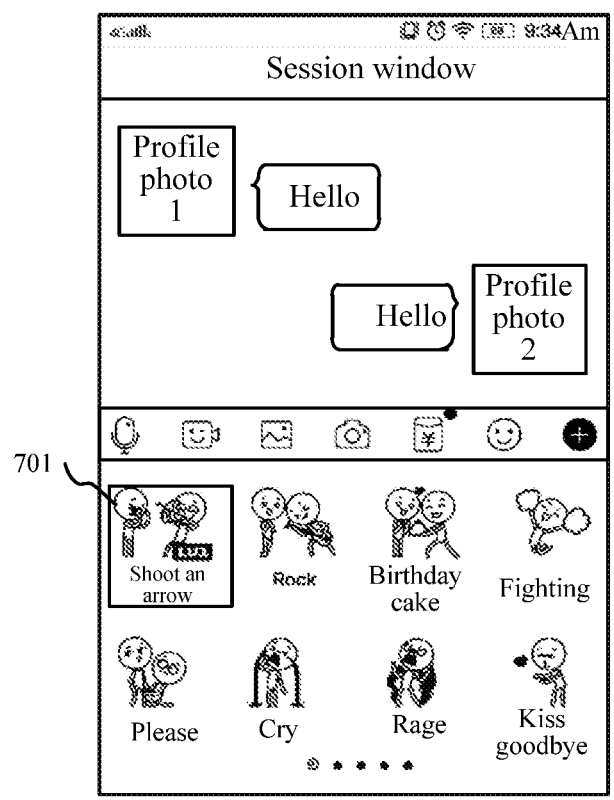
FIG. 7 is a schematic interface diagram of displaying optional action options in a session window according to an embodiment.

FIG. 7 is a schematic interface diagram of displaying optional action options in a session window according to an embodiment. Referring to FIG. 7, the terminal can display multiple optional action options in the current session window in an array form, for example, an optional action option 701, and can perform multi-page switching. Each optional action option can display a text that describes a corresponding action and a schematic diagram.

The action selection instruction is an instruction to select the optional action option, which can be triggered by many manners such as a touch manner, a physical button manner, or a sound control manner. The action selection instruction can correspond to one of the multiple optional action options to indicate selection of the optional action option. For example, the user clicks an optional action option 701 shown in FIG. 7 to obtain an action selection instruction corresponding to the optional action option 701.

Referring back to FIG. 6, the method continues:

Step 612: Determine the action identifier according to the action selection instruction.

After receiving the action selection instruction, the terminal obtains an identifier of the optional action option corresponding to the action selection instruction, to determine the action identifier according to the optional action option. The identifier of the optional action option can be directly regarded as the action identifier.

In this embodiment, the user identity is determined according to the animation generation instruction, to obtain the first rig data corresponding to the user identity, so that virtual targets with different images are generated according to the first bone data and the first rig data in the following of generating animation, thereby generating different animation aiming at different users. The first rig data corresponding to the user identity can be autonomously set by a corresponding user. The action identifier can be flexibly selected by triggering the action selection instruction, to generate an animation presenting different actions.

Figure 8:
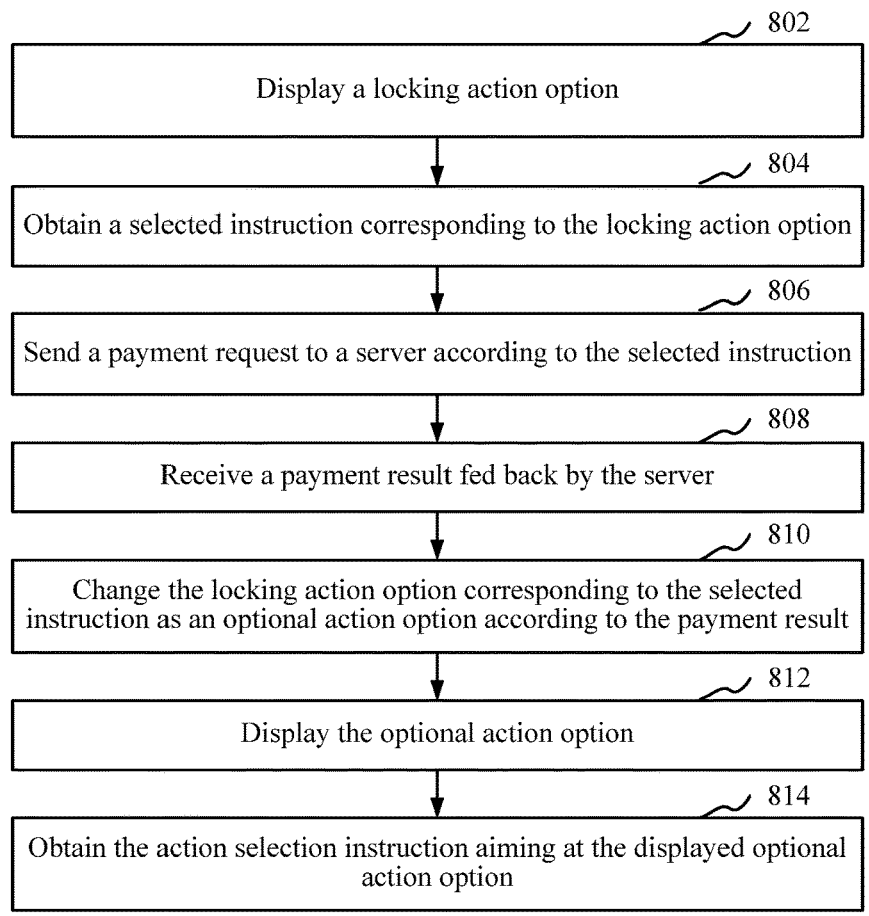
FIG. 8 is a schematic flowchart of a step of obtaining an action selection instruction according to an embodiment.

FIG. 8 is a schematic flowchart of a step of obtaining an action selection instruction according to an embodiment. As shown in FIG. 8, in an embodiment, the step 610 of FIG. 6 includes the following steps:

Step 802: Display a locking action option.

The locking action option is an action option that a currently logged-in user has not registered a right of use. A terminal can provide a mall entrance and enter a mall page when detecting a triggering operation on the mall entrance, to display the locking action option in the mall page. The locking action option can be displayed with a current optional action option or in a same page. The locking action option can be displayed in a list form, an array form, or a form of multi-page switching display. The locking action option can add a locking mark into a corresponding action option to indicate that the action option is the locking action option. The triggering operation includes a clicking operation, a double clicking operation, a sliding operation, or a longtime pressing operation.

Step 804: Obtain a selected instruction corresponding to the locking action option.

The selected instruction is an instruction to select the locking action option, which can be triggered by many manners such as a touch manner, a physical button manner, or a sound control manner. The selected instruction can correspond to one of the multiple locking action options to indicate selection of the locking action option.

Step 806: Send a payment request to a server according to the selected instruction.

The terminal can obtain a payment amount corresponding to the locking action option corresponding to the selected instruction and obtain a payer identifier, to generate a payment request carrying the payment amount and the payer identifier and send the payment request to the server, so that the server decreases the payment amount from a fund account corresponding to the payer identifier and increases the payment amount into a fund account corresponding to an identifier of a mall runner.

In an embodiment, the terminal can send the locking action option corresponding to the selected instruction to a first server, so that the first server obtains the payment amount and a payee identifier according to an identifier of the locking action option to generate corresponding order data. The order data includes the payment amount and the payee identifier. The terminal receives the order data fed back by the first server, generates a payment request carrying the payment amount, the payer identifier, and the payee identifier according to the order data, and sends the payment request to the first server or a second server, so that the first server or the second server decreases the payment amount from a fund account corresponding to the payer identifier and increases the payment amount into a fund account corresponding to the payee identifier. The first server and the second server can be maintained by different runners.

Step 808: Receive a payment result fed back by the server.

The terminal receives the payment result fed back by the server after completing payment. The payment result includes information indicating payment success or payment failure.

Step 810: Change the locking action option corresponding to the selected instruction as an optional action option according to the payment result.

The terminal can recognize the payment result. If the payment result indicates payment success, the selected locking action option is changed to the optional action option and a locking mark in the locking action option is further removed. If the payment result indicates payment failure, a user is prompted to repay or exit a mall page.

Step 812: Display the optional action option.

Step 814: Obtain the action selection instruction aiming at the displayed optional action option.

In this embodiment, an action option includes the locking action option and the optional action option. The locking action option can be changed as the optional action option, so that a user can autonomously select an appropriate optional action option to enrich available animation, thereby improving convenience of an operation.

In an embodiment, action data corresponding to an action identifier, second bone data used for an additional element, and corresponding second rig data can be instantly obtained by using a network. First rig data used for a virtual target can be instantly obtained by using the network. First bone data can be obtained and buffered from the network at first obtaining and the buffered first bone data can be directly obtained at next obtaining. In this embodiment, consumption of storage resources at a local terminal can be reduced. The action data, the second bone data used for the additional element, and the second rig data can be obtained by using the network, which consumes few network resources and can perform a timely response.

In an embodiment, the first rig data includes a first rig image, a first vertex grid, and first mapping data. The first mapping data is used to map the first rig image into the first vertex grid and map a vertex in the first vertex grid into a corresponding bone in the first bone data. The second rig data includes a second rig image, a second vertex grid, and second mapping data. The second mapping data is used to map the second rig image into the second vertex grid and map a vertex in the second vertex grid into a corresponding bone in the second bone data.

Figure 9:
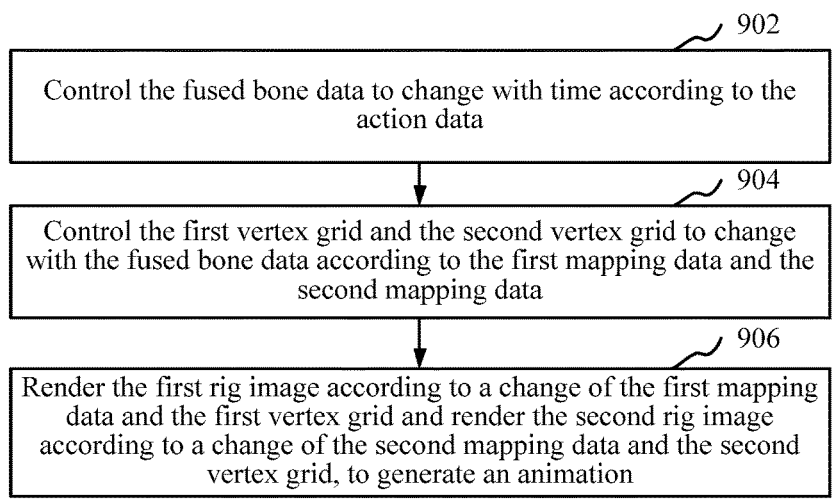
FIG. 9 is a schematic flowchart of a step of controlling fused bone data to change with time according to action data and rendering an animation according to the fused bone data changing with time, first rig data, and second rig data according to an embodiment.

FIG. 9 is a schematic flowchart of a step of controlling fused bone data to change with time according to action data and rendering an animation according to the fused bone data changing with time, first rig data, and second rig data according to an embodiment. As shown in FIG. 9, in an embodiment, the step 308 of FIG. 3 includes the following steps:

Step 902: Control the fused bone data to change with time according to the action data.

The action data records data of how to control a bone of a virtual target and a bone of the additional element to change. Changing information of the bone of the virtual target and the bone of the additional element in each animation frame can be recorded according to a time sequence. The terminal controls the fused bone data to change with time according to the recorded changing information in the action data.

Step 904: Control the first vertex grid and the second vertex grid to change with the fused bone data according to the first mapping data and the second mapping data.

A vertex is a composing unit of a vertex grid, attached to a bone. The vertex in the vertex grid can form a triangle. A rig image can be added into the triangle. The vertex grid can include a position of each vertex and a relationship between vertexes. Mapping data can map each position of the rig image to the vertex in the vertex and bind the vertex in the vertex with a bone in the fused bone data. The vertex grid includes the first vertex grid and the second vertex and the mapping data includes the first mapping data and the second mapping data.

Step 906: Render the first rig image according to a change of the first mapping data and the first vertex grid and render the second rig image according to a change of the second mapping data and the second vertex grid, to generate an animation.

A change of the fused bone data leads to a change of the vertex grid by using the mapping data, leading to a change of the rig image. The rig image includes a first rig image and a second rig image. The terminal can perform image processing to the rig image before rendering the rig image, for example, changing a color, brightness, or contrast. The terminal can draw the first rig image and the second rig image frame by frame to form the animation.

In this embodiment, the fused bone data is controlled to change with time according to the action data and a corresponding vertex grid is controlled to change with the fused bone data, to draw the rig image according to a change of the rig image, so that the terminal can complete each frame in the animation by multiplexing the rig image without pre-storing each animation frame, thus largely reducing consumption of storage resources.

In an embodiment, the action data is separated from complete animation modeling data including a virtual target and an additional element and first rig data, second bone data, and second rig data are exported from the complete animation modeling data.

Complete animation modeling data including the virtual target and the additional element is established by using third party modeling software. Bone data in the complete modeling data includes first bone data and the second bone data. The complete modeling data includes the action data matching with the virtual target and the additional element and further includes the first rig data and the second rig data.

Further, the action data can be automatically separated from the complete animation modeling data by using s self-defining tool. The first bone data and the first rig data used for the virtual target are exported. The second bone data and the corresponding second rig data used for the additional element are exported. After the bone data and the corresponding second rig data used for the additional element are exported, the corresponding second mapping data can be reestablished.

In this embodiment, the action data, the second bone data used for the additional element, and the corresponding second rig data are obtained according to the complete animation modeling data, to avoid a problem of an complex operation and difficult action data synchronization caused by respectively establishing different animation modeling data for the virtual target and the additional element.

In an embodiment, the terminal can render the animation in an animation display area according to the fused bone data changing with time, the first rig data, and the second rig data after determining the animation display area in a current session window of an instant messaging application.

The session window may be a pair session window or a group session window. The animation display area may be located at a fixed position in the current session window, may be a position specified by a currently logged-in user, or may further be a blank that has not displayed a message in the current session window. The fixed position may be, for example, a bottom middle position of the current session window or a center position of the whole current session window. When the terminal generates the animation, the terminal renders the animation at the animation display area in the current session window according to the rig image changing with the fused bone data.

In an embodiment, the animation generation method further includes sending an animation message to a terminal corresponding to a session object, so that the terminal corresponding to the session object obtains fused bone data, action data, first rig data, and second rig data according to the animation message, controls the fused bone data to change with time according to the action data, and renders an animation according to the fused bone data changing with time, the first rig data, and the second rig data.

The animation message is a message of controlling the terminal corresponding to the session object to display the animation. The session object may be a personal user or a group member. The terminal corresponding to the session object can render the animation in the animation display area in the current session window of the instant messaging application operated on the terminal. The terminal corresponding to the session object can execute all steps same as the terminal of the foregoing animation generation method described by examples in this embodiment.

In this embodiment, the animation message is sent to the terminal corresponding to the session object, so that the session object can synchronously display the animation with the terminal, making it convenient to sending information by using the animation message, thus providing more communication manners including a text message. In addition, when a user can self-select an action option, the information sent by using the animation message may become more flexible, abundant, and effective.

The following uses an application scene to describe a principle of the foregoing animation generation method.

Figure 10:
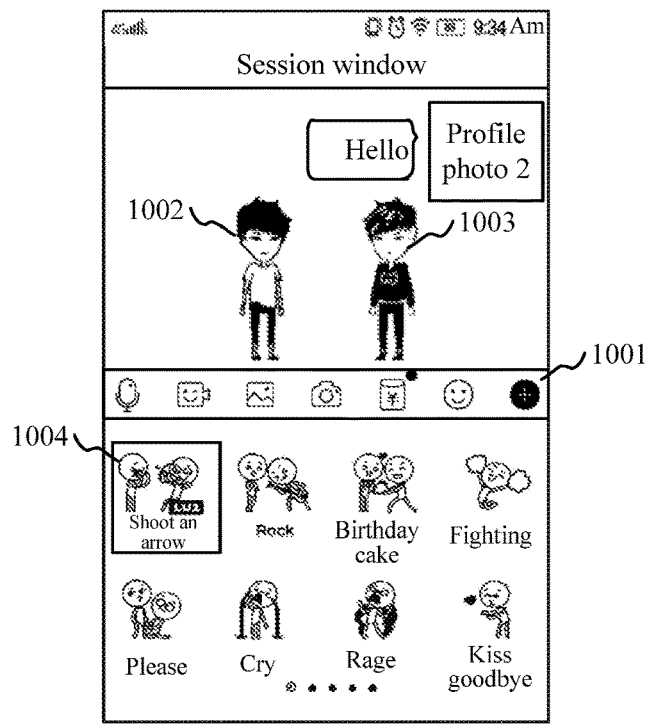
FIG. 10 is a schematic diagram of displaying a virtual character in an initial state according to an embodiment.
Figure 11:
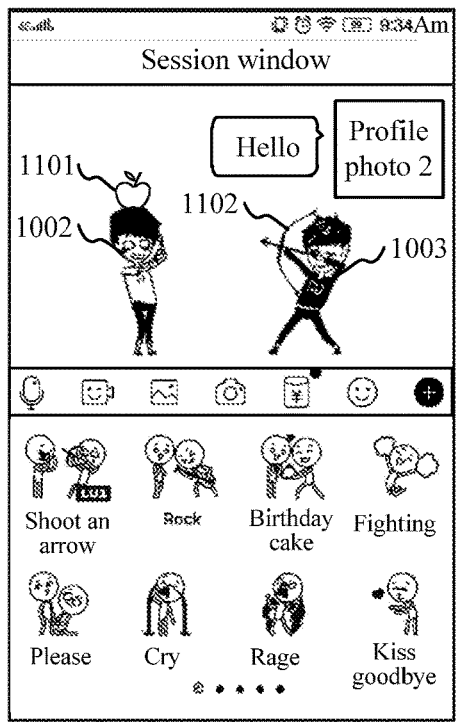
FIG. 11 is a schematic diagram of rendering an animation in a session page according to an embodiment.

FIG. 10 is a schematic diagram of displaying a virtual character in an initial state according to an embodiment. FIG. 11 is a schematic diagram of rendering an animation in a session page according to an embodiment.

As shown in FIGS. 10 and 11, a user performs a session with a session object by using a terminal. Sending and display of an instant message can be triggered in a session window. The terminal displays a toolbar 1001 in the session window, detects a triggering operation of the toolbar 1001, displays an optional action option according to the triggering operation, and displays virtual characters 1002 and 1003. After the user selects "shoot an arrow," that is, the optional action option 1004, the terminal can instantly obtain action data used to trigger an action of "shoot an arrow" corresponding to the optional action option 1004 by using a network and second bone data and corresponding second rig data of an addition prop "apple" 1101 and an additional prop "arrow" 1102 corresponding to the optional action option 1004. First bone data of the virtual character 1002 and the second bone data of the addition prop 1101 are fused to obtain corresponding fused bone data and first bone data of the virtual character 1003, and the second bone data of the addition prop 1101 are fused to obtain corresponding fused bone data, to render an animation according to the action data, the obtained fused bone data, and the corresponding second rig data. An effect of a frame of the animation is shown in FIG. 11.

Figure 12:
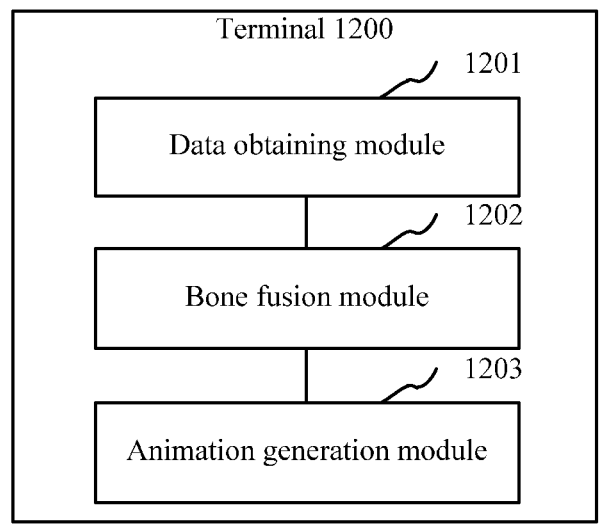
FIG. 12 is a structural block diagram of a terminal according to an embodiment.

FIG. 12 is a structural block diagram of a terminal according to an embodiment. As shown in FIG. 12, in an embodiment, this application further provides a terminal 1200. An inner structure of the terminal 1200 may correspond to the structure shown in FIG. 2. All or some of the modules described below may be implemented by software, hardware, or a combination thereof. The terminal 1200 includes a data obtaining module 1201, a bone fusion module 1202, and an animation generation module 1203.

The data obtaining module 1201 is configured to: obtain an animation generation instruction, obtain first bone data used for a virtual target and first rig data used for the virtual target according to the animation generation instruction, obtain an action identifier, and obtain action data corresponding to the action identifier, second bone data used for an additional element, and corresponding second rig data.

The bone fusion module 1202 is configured to fuse the first bone data and the second bone data to obtain fused bone data.

The animation generation module 1203 is configured to control the fused bone data to change with time according to the action data and render animation according to the fused bone data changing with time, the first rig data, and the second rig data.

The foregoing terminal 1200 separates data corresponding to the virtual target in animation from data corresponding to an additional element, obtains the first bone data, the first rig data, the action data, the second bone data, and the corresponding second rig data that are used in generating animation when the animation generation instruction is obtained to generate an animation, fuses the first bone data used for the virtual target and the second bone data used for the additional element to obtain the fused bone data, and controls the fused bone data to change according to the action data, to render animation. Different actions in different animations can be distinguished according to different action identifiers. The virtual target, the action data of various actions, and the additional element are combined to implement colorful animations without separately storing complete data of each animation, thus reducing consumption of storage resources.

Figure 13:
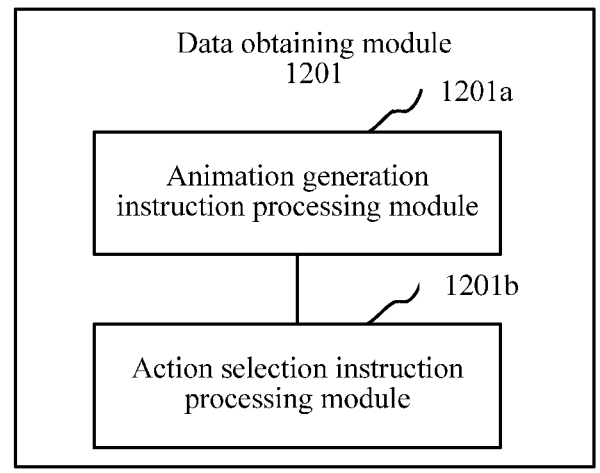
FIG. 13 is a structural block diagram of a data obtaining module according to an embodiment.

FIG. 13 is a structural block diagram of a data obtaining module according to an embodiment. As shown in FIG. 13, in an embodiment, the data obtaining module 1201 of FIG. 12 includes an animation generation instruction processing module 1201a and an action selection instruction processing module 1201b.

The animation generation instruction processing module 1201a is configured to: obtain the animation generation instruction, determine a user identity according to the animation generation instruction, obtain the first rig data corresponding to the user identity and used for the virtual target, and obtain the first bone data used for the virtual target.

The action selection instruction processing module 1201*b* is configured to obtain an action selection instruction and determine the action identifier according to the action selection instruction.

In an embodiment, the animation generation instruction processing module 1201*a* is further configured to obtain the first bone data publicly used by the virtual target according to the animation generation instruction, or obtain the first bone data corresponding to the user identity and used for the virtual target.

Figure 14:
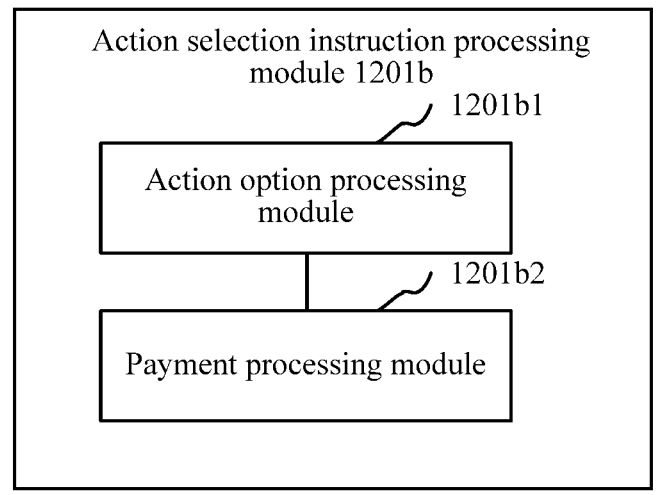
FIG. 14 is a structural block diagram of an action selection instruction processing module according to an embodiment.

FIG. 14 is a structural block diagram of an action selection instruction processing module according to an embodiment. As shown in FIG. 14, in an embodiment, the action selection instruction processing module 1201*b* of FIG. 13 includes an action option processing module 1201*b*1 and a payment processing module 1201*b*2.

The action option processing module 1201*b*1 is configured to display a locking action option and obtain a selected instruction corresponding to the locking action option.

The payment processing module 1201*b*2 is configured to send a payment request to a server according to the selected instruction and receive a payment result fed back by the server.

The action option processing module 1201*b*1 is further configured to: change the locking action option corresponding to the selected instruction as an optional action option according to the payment result, display the optional action option, and obtain the action selection instruction aiming at the displayed optional action option.

In an embodiment, the first bone data includes a bone state and a layer relationship between bones. A bone fusion module 1202 is further configured to add a bone in the second bone data to a bone in the first bone data according to the second bone data and adjust the layer relationship between the additional bone and the corresponding bone in the first bone data to obtain the fused bone data.

In an embodiment, first rig data includes a first rig image, a first vertex grid, and first mapping data. The first mapping data is used to map the first rig image into the first vertex grid and map a vertex in the first vertex grid into a corresponding bone in the first bone data. The second rig data includes a second rig image, a second vertex grid, and second mapping data. The second mapping data is used to map the second rig image into the second vertex grid and map a vertex in the second vertex grid into a corresponding bone in the second bone data.

Figure 15:
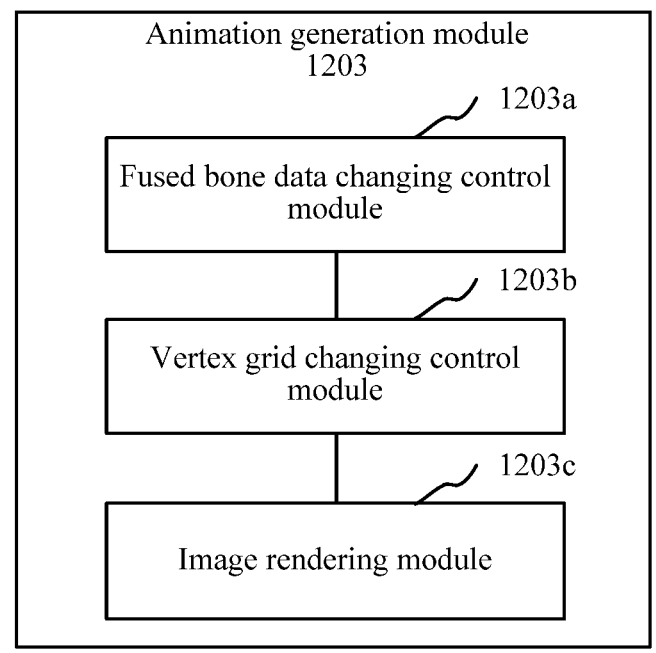
FIG. 15 is a structural block diagram of an animation generation module according to an embodiment.

FIG. 15 is a structural block diagram of an animation generation module according to an embodiment. As shown in FIG. 15, in an embodiment, the animation generation module 1203 of FIG. 12 includes a fused bone data changing control module 1203*a*, a vertex grid changing control module 1203*b*, and an image rendering module 1203*c*.

The fused bone data changing control module 1203*a* is configured to control the fused bone data to change with time according to an action data.

The vertex grid changing control module 1203*b* is configured to control the first vertex grid and the second vertex grid to change with the fused bone data according to the first mapping data and the second mapping data.

The image rendering module 1203*c* is configured to render the first rig image according to a change of the first mapping data and the first vertex grid and render the second rig image according to a change of the second mapping data and the second vertex grid, to generate an animation.

In an embodiment, the action data is separated from complete animation modeling data including a virtual target and an additional element and first rig data, second bone data, and second rig data are exported from the complete animation modeling data.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a non-volatile storage medium such as a magnetic disk, an optical disc, or a read-only memory (ROM), or may be a random access memory (RAM) or the like.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

Various technical features in the foregoing embodiments may be combined randomly. For ease of description, possible combinations of various technical features in the foregoing embodiments are not all described. However, the combinations of the technical features may be considered as falling within the scope recorded in this specification provided that the combinations of the technical features are compatible with each other.

The foregoing embodiments only describe several implementations of this application, which are described specifically and in detail, and therefore cannot be construed as a limitation to the patent scope of the disclosure. A person of ordinary skill in the art may make various changes and improvements without departing from the ideas of this application, which shall all fall within the protection scope of this application. Therefore, the protection scope of the patent of this application shall be subject to the additional claims.

What is claimed is:

1. An animation generation method being performed by at least one processor, the method comprising:
obtaining an animation generation instruction;
obtaining first bone data for a virtual target and first rig data for the virtual target, based on the animation generation instruction;

obtaining an action identifier;
obtaining action data, second bone data for an additional element, and second rig data for the additional element, based on the action identifier;
fusing the first bone data and the second bone data to obtain fused bone data;
controlling the fused bone data to change with time, based on the action data;
rendering an animation, based on the fused bone data controlled to change with time, the first rig data, and the second rig data;
wherein the first rig data comprises a first rig image, a first vertex grid, and first mapping data,
wherein the first mapping data is used to map the first rig image into the first vertex grid and to map a first vertex in the first vertex grid into a corresponding first bone in the first bone data,
wherein the second rig data comprises a second rig image, a second vertex grid, and second mapping data,
wherein the second mapping data is used to map the second rig image into the second vertex grid and to map a second vertex in the second vertex grid into a corresponding second bone in the second bone data,
wherein the controlling the fused bone data to change with time comprises controlling the first vertex grid and the second vertex grid to change with the fused bone data, based on the first mapping data and the second mapping data, and
wherein the rendering the animation comprises rendering the first rig image, based on a first change of the first mapping data and the first vertex grid, and rendering the second rig image, based on a second change of the second mapping data and the second vertex grid, to generate the animation.

2. The method according to claim 1, wherein the obtaining the first bone data comprises:
determining a user identity, based on the animation generation instruction; and
obtaining the first rig data corresponding to the user identity, and
wherein the obtaining the action identifier comprises:
obtaining an action selection instruction; and
determining the action identifier, based on the action selection instruction.

3. The method according to claim 2, wherein the obtaining the first bone data comprises:
obtaining the first bone data that is publicly used by the virtual target, based on the animation generation instruction; or
obtaining the first bone data corresponding to the user identity.

4. The method according to claim 2, wherein the obtaining the action selection instruction comprises:
displaying a locking action option;
obtaining a first selection of the locking action option that is displayed;
sending a payment request to a server, based on the first selection;
receiving a payment result from the server, based on the payment request that is sent;
changing the locking action option corresponding to the first selection to an optional action option, based on the payment result;
displaying the optional action option; and
obtaining, as the action selection instruction, a second selection of the optional action option that is displayed.

5. The method according to claim 1, wherein the first bone data comprises a bone state and a layer relationship between a plurality of bones, and
wherein the fusing the first bone data and the second bone data comprises:
adding, to the corresponding first bone in the first bone data, the corresponding second bone in the second bone data; and
adjusting the layer relationship between the second bone and a corresponding bone in the first bone data, to obtain the fused bone data.

6. The method according to claim 1, wherein the action data is separated from animation modeling data comprising the virtual target and the additional element, and
wherein the first rig data, the second bone data, and the second rig data are exported from the animation modeling data.

7. A terminal comprising:
at least one memory configured to store computer program code; and
at least one processor configured to access the at least one memory and operate according to the computer program code, the computer program code comprising:
data obtaining code configured to cause the at least one processor to:
obtain an animation generation instruction;
obtain first bone data for a virtual target and first rig data for the virtual target, based on the animation generation instruction;
obtain an action identifier; and
obtain action data, second bone data for an additional element, and second rig data for the additional element, based on the action identifier;
bone fusion code configured to cause the at least one processor to fuse the first bone data and the second bone data to obtain fused bone data; and
animation generation code configured to cause the at least one processor to:
control the fused bone data to change with time, based on the action data; and
render an animation, based on the fused bone data controlled to change with time, the first rig data, and the second rig data,
wherein the first rig data comprises a first rig image, a first vertex grid, and first mapping data,
wherein the first mapping data is used to map the first rig image into the first vertex grid and to map a first vertex in the first vertex grid into a corresponding first bone in the first bone data,
wherein the second rig data comprises a second rig image, a second vertex grid, and second mapping data,
wherein the second mapping data is used to map the second rig image into the second vertex grid and to map a second vertex in the second vertex grid into a corresponding second bone in the second bone data, and
wherein the animation generation code comprises:
vertex grid changing control code configured to cause the at least one processor to control the first vertex grid and the second vertex grid to change with the fused bone data, based on the first mapping data and the second mapping data; and
image rendering code configured to cause the at least one processor to render the first rig image, based on a first change of the first mapping data and the first vertex grid, and render the second rig image, based on a second change of the second mapping data and the second vertex grid, to generate the animation.

8. The terminal according to claim 7, wherein the computer program code further comprises:
    animation generation instruction processing code configured to cause the at least one processor to:
        determine a user identity, based on the animation generation instruction; and
        obtain the first rig data corresponding to the user identity; and
    action selection instruction processing code configured to cause the at least one processor to:
        obtain an action selection instruction; and
        determine the action identifier, based on the action selection instruction.

9. The terminal according to claim 8, wherein the animation generation instruction processing code is further configured to cause the at least one processor to:
    obtain the first bone data that is publicly used by the virtual target, based on the animation generation instruction; or
    obtain the first bone data corresponding to the user identity.

10. The terminal according to claim 8, wherein the animation selection instruction processing code comprises:
    action option processing code configured to cause the at least one processor to:
        display a locking action option; and
        obtain a first selection of the locking action option that is displayed; and
    payment processing module configured to cause the at least one processor to:
        send a payment request to a server, based on the first selection; and
        receive a payment result from the server, based on the payment request that is sent,
    wherein the action option processing code is further configured to cause the at least one processor to:
    change the locking action option corresponding to the first selection to an optional action option, based on the payment result;
    display the optional action option; and
    obtain, as the action selection instruction, a second selection of the optional action option that is displayed.

11. The terminal according to claim 7, wherein the first bone data comprises a bone state and a layer relationship between a plurality of bones, and
    wherein the bone fusion code is further configured to cause the at least one processor to:
        add, to the corresponding first bone in the first bone data, the corresponding second bone in the second bone data; and
        adjust the layer relationship between the second bone and a corresponding bone in the first bone data, to obtain the fused bone data.

12. The terminal according to claim 7, wherein the action data is separated from animation modeling data comprising the virtual target and the additional element, and
    wherein the first rig data, the second bone data, and the second rig data are exported from the animation modeling data.

13. A non-transitory computer-readable storage medium storing instructions that cause at least one processor of a terminal to:
    obtain an animation generation instruction;
    obtain first bone data for a virtual target and first rig data for the virtual target, based on the animation generation instruction;
    obtain an action identifier;
    obtain action data, second bone data for an additional element, and second rig data for the additional element, based on the action identifier;
    fuse the first bone data and the second bone data to obtain fused bone data;
    control the fused bone data to change with time, based on the action data; and
    render an animation, based on the fused bone data controlled to change with time, the first rig data, and the second rig data,
    wherein the first rig data comprises a first rig image, a first vertex grid, and first mapping data,
    wherein the first mapping data is used to map the first rig image into the first vertex grid and to map a first vertex in the first vertex grid into a corresponding first bone in the first bone data,
    wherein the second rig data comprises a second rig image, a second vertex grid, and second mapping data,
    wherein the second mapping data is used to map the second rig image into the second vertex grid and to map a second vertex in the second vertex grid into a corresponding second bone in the second bone data, and
    wherein the instructions further cause the processor to:
        control the first vertex grid and the second vertex grid to change with the fused bone data, based on the first mapping data and the second mapping data; and
        render the first rig image, based on a first change of the first mapping data and the first vertex grid, and render the second rig image, based on a second change of the second mapping data and the second vertex grid, to generate the animation.

14. The non-transitory computer-readable storage medium according to claim 13, wherein the instructions further cause the processor to:
    determine a user identity, based on the animation generation instruction;
    obtain the first rig data corresponding to the user identity;
    obtain an action selection instruction; and
    determine the action identifier, based on the action selection instruction.

15. The non-transitory computer-readable storage medium according to claim 14, wherein the instructions further cause the processor to:
    display a locking action option;
    obtain a first selection of the locking action option that is displayed;
    send a payment request to a server, based on the first selection;
    receive a payment result from the server, based on the payment request that is sent;
    change the locking action option corresponding to the first selection to an optional action option, based on the payment result;
    display the optional action option; and
    obtain, as the action selection instruction, a second selection of the optional action option that is displayed.

* * * * *